Dec. 25, 1962 TAKEO KATO 3,069,722

BLOW MOULDER

Filed Dec. 29, 1959 12 Sheets-Sheet 1

Dec. 25, 1962 | TAKEO KATO | 3,069,722

BLOW MOULDER

Filed Dec. 29, 1959 | 12 Sheets-Sheet 2

Dec. 25, 1962

TAKEO KATO 3,069,722

BLOW MOULDER

Filed Dec. 29, 1959

12 Sheets-Sheet 10

3,069,722

BLOW MOULDER

Takeo Kato, No. 70, Higashi 4-Chome, Magome-Machi, Ota-Ku, Tokyo, Japan

Filed Dec. 29, 1959, Ser. No. 862,507
Claims priority, application Japan May 27, 1959
5 Claims. (Cl. 18—5)

This invention relates to a blow moulder, wherein tubings are preliminarily made in a successive order from a plastics, such as polyethylene, polyvinyl chloride resin, glass and the like, and the thus produced tubing is led into a split mould and blow moulded therein in the desired shape, in order to obtain hollow vessels, bottles, toys, tumblers, test-tubes, flasks, models, ribs for umbrellas, or the like.

A main object of the invention is to provide a blow moulder of the kind above referred to, which is considerably simpler in its design and construction, and thus cheaper in its price, than the conventional machine, yet without any loss of its superior effective performance, rather providing more efficient characteristics and novelties as disclosed hereinafter.

Another object is to provide a blow moulder of the kind above referred to, by means of which the practically continuous production of the desired hollow products can be produced in a simple and rapid manner.

Another object is to provide a blow moulder of the kind above referred to, wherein the continuously supplied mouldable material from an extruder is preliminarily shaped in tubes alternately by means of a couple of nozzles, thus making the blow moulding practicable in an alternative, but practically continuous manner as a whole.

Another object of the invention is to provide a blow moulder of the kind above referred to, which is provided with means for neatly cutting and finishing the mouth edge of the hollow product in the course of production, thereby eliminating such disadvantage of the conventional machine that the mouth of the product provides irregular appearance and shape, which must be finished in a separate finishing procedure.

Another object is to provide the above mentioned means, which is operable regardless of the moulding mode, more specifically, regardless of normal or inverted moulding of the hollow products.

Still another object of the invention is to provide a blow moulder of the kind above referred to, which, in the case of producing the body of a doll a plurality of recesses adapted for detachable connection of its limbs may be shaped in the body during the course of moulding of the same, whereby, however, the shaping pins used for the purpose can be drawn out without any hindrance.

Still another object of the invention is to provide a blow moulder of the kind above referred to, wherein the split mould is shaped and arranged for easy exchange with another and the necessary operation for the exchange is easy and simple.

Still another object of the invention is to provide a blow moulder of the kind above referred to, wherein proper centering operation of each moulding unit can be easily and accurately carried out.

Still further objective is to provide a blow moulder of the kind above referred to, which is provided with cutting means adapted to cut off the blind end of the preliminarily shaped and supplied tubing to moulding unit, which blind end is formed in the case of inverted mode moulding after every moulding step, in order thereby to facilitate the entrance of the upwardly operating slide pin into the tubing.

Still further object is to provide hydraulic and electric circuit means adapted to carry out the necessary operations of the blow moulder in an almost fully automatic way.

These and other objects, characteristics, mechanisms, functions, operations, effects and advantages of the invention will become clearer as the description proceeds, taken in connection with the accompanying drawings, illustrating several preferred embodiments of the invention.

Figure 7:
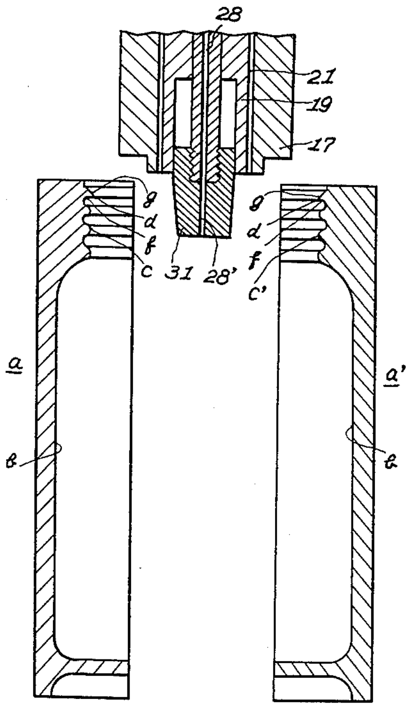
FIGURE 7 is an enlarged longitudinal section of the split mould.
Figure 9:
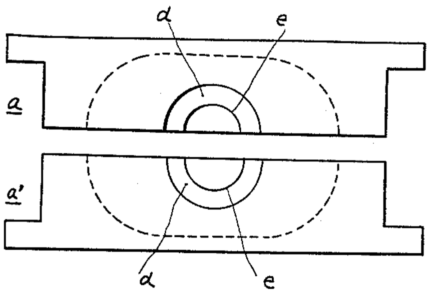
Figures 10, 11, 12:
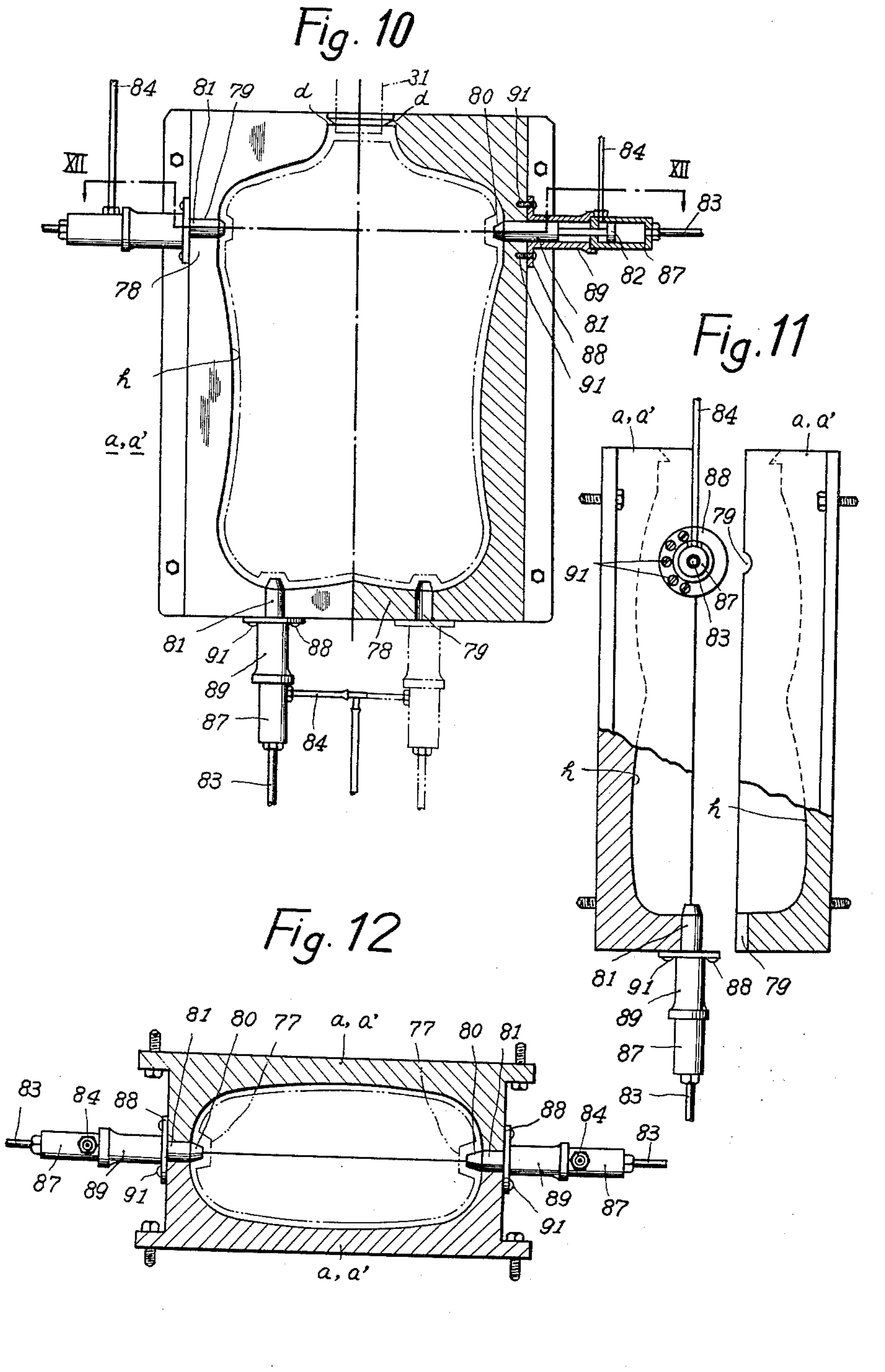
Figures 13, 14, 16:
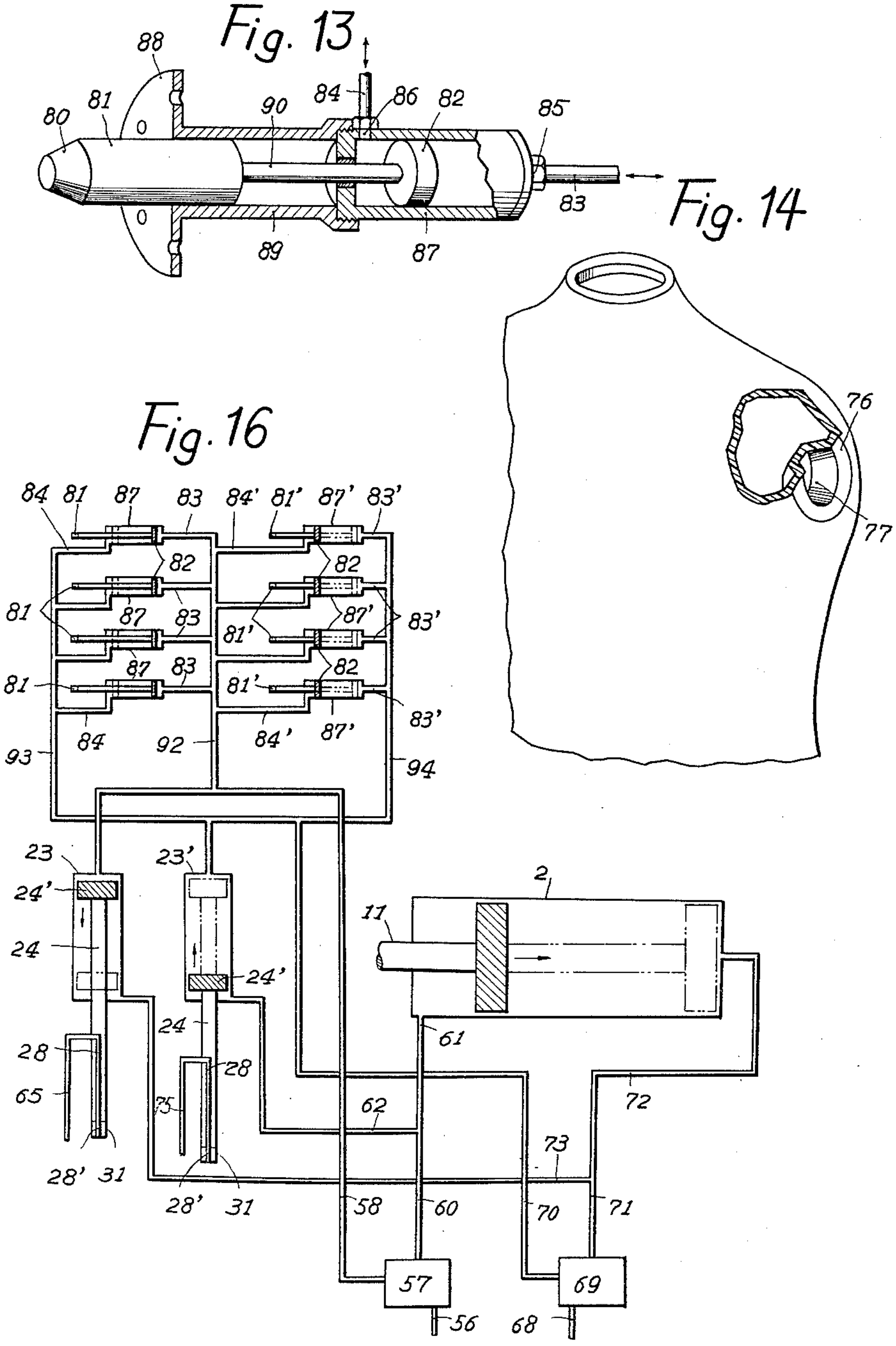
Figure 15:
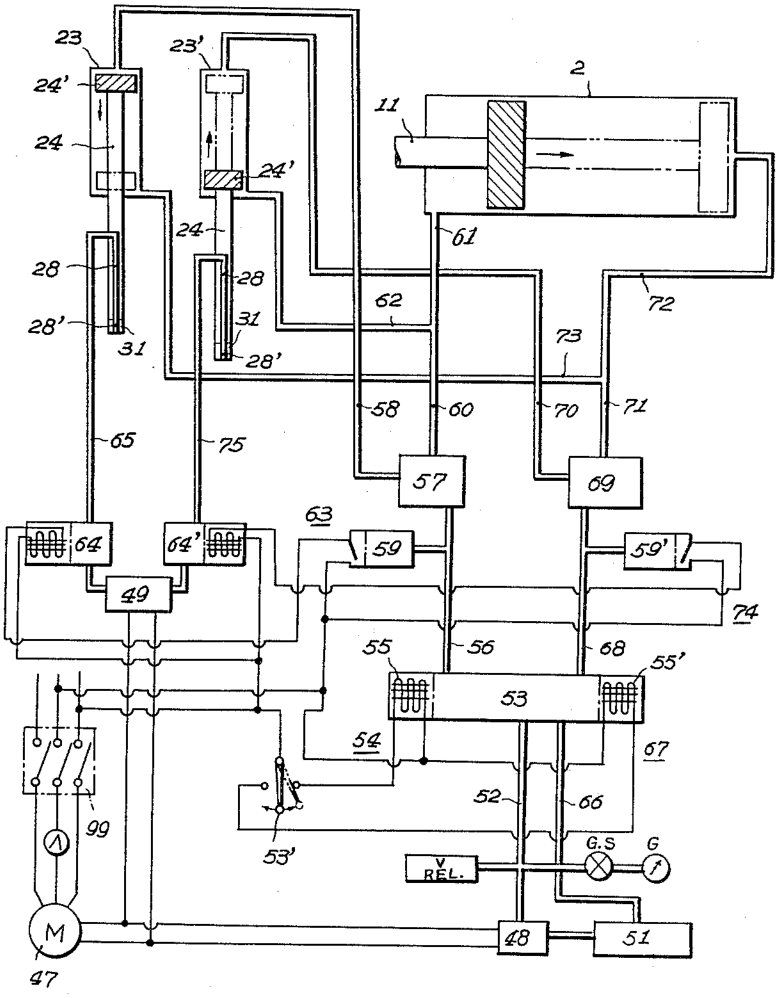
Figure 17:
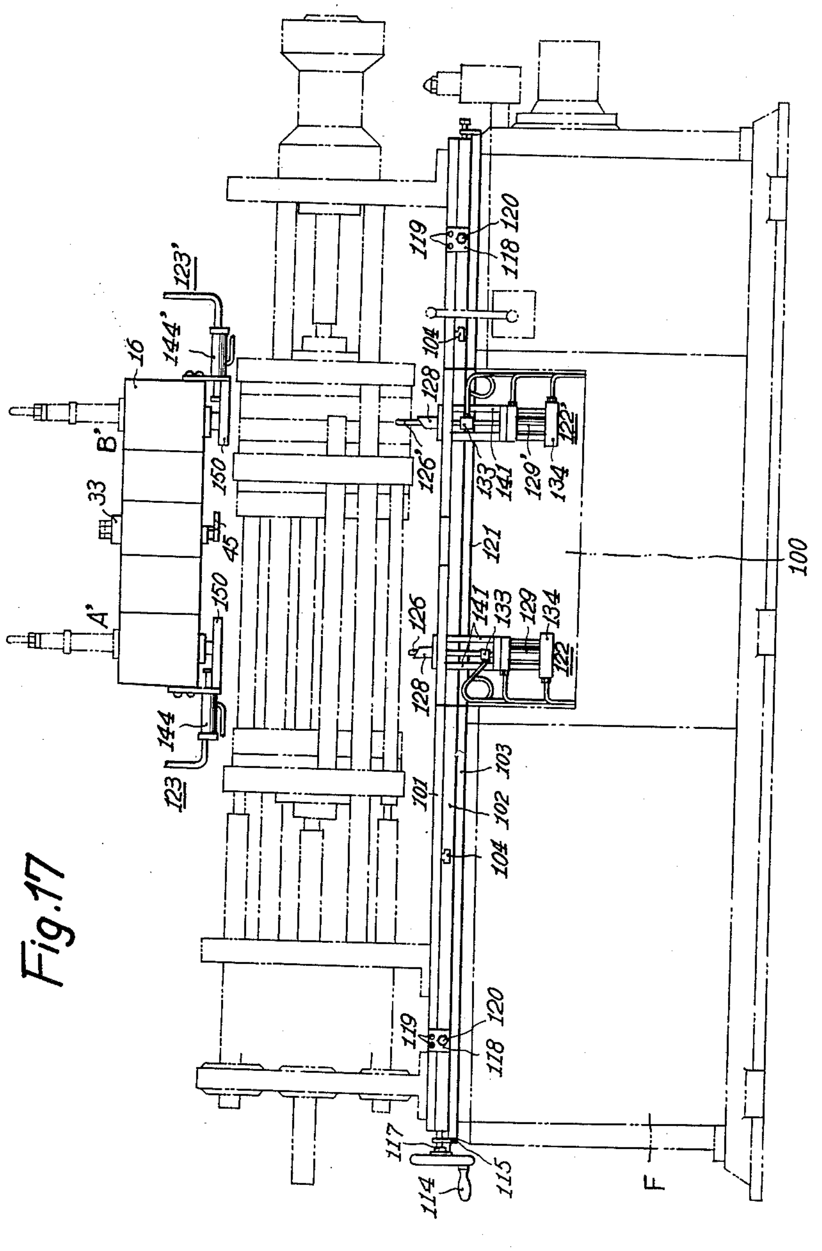
Figures 18, 19, 20:
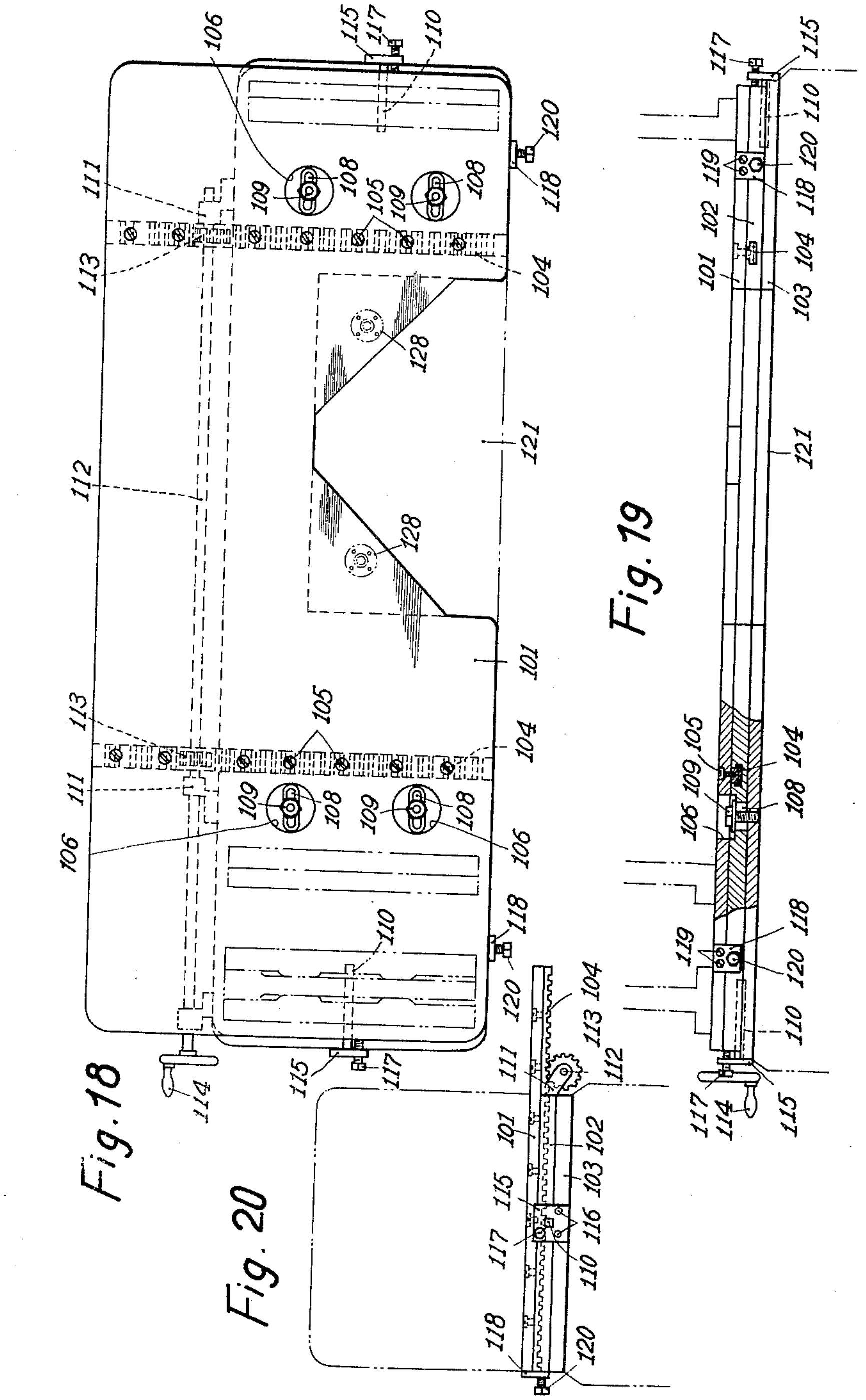
Figures 21, 21A, 25, 26:
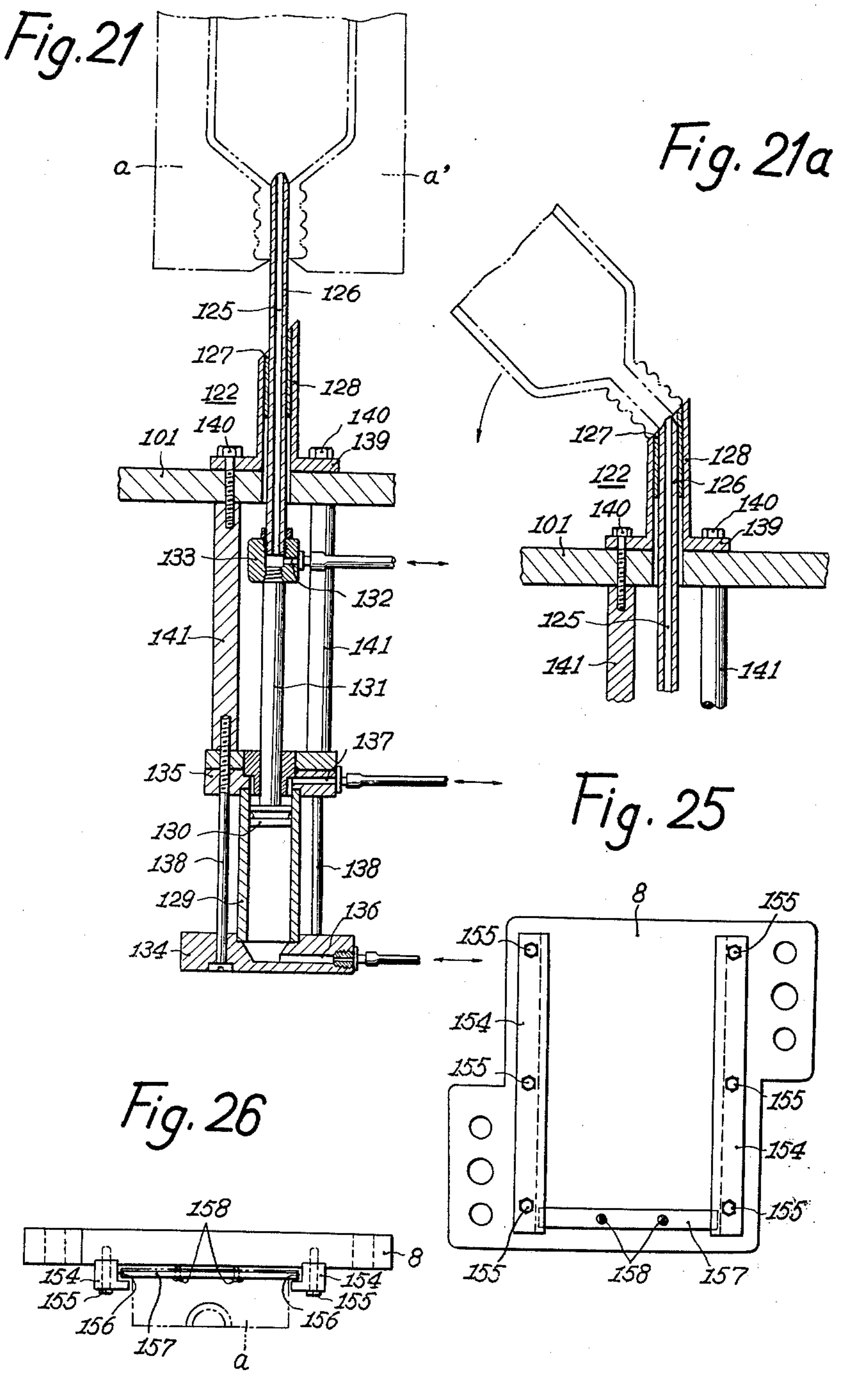
Figure 22:
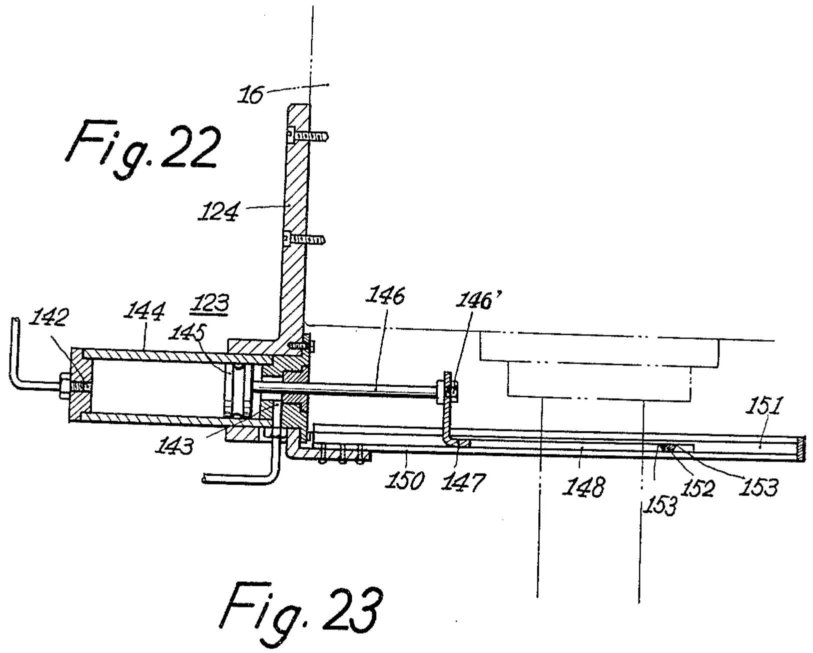
Figure 23:
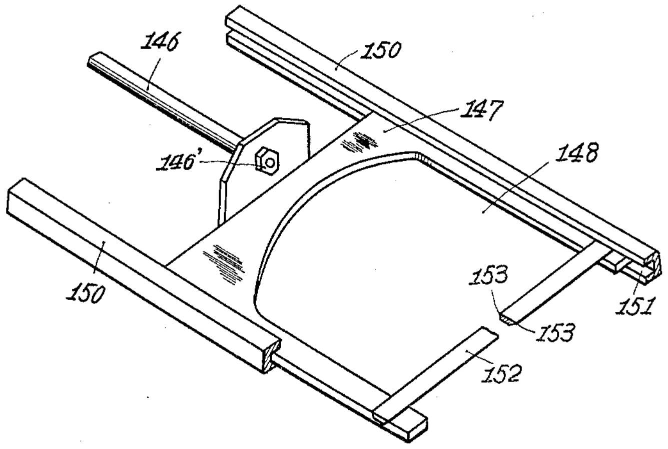
Figure 24:
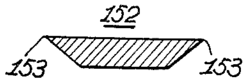

FIGURES 8, 8*a*, 8*b* and 8*c* illustrate diagrammatically the successive moulding stages using the above mentioned split mould;

FIGURE 9 is a plan view of the split mould shown in FIGURE 7, of which, however, the mouth-edge cutting slide pin or mandrel has been removed;

FIGURE 10 represents an enlarged, partially sectional front view of a modified embodiment of split mould assembly, which is adapted for the production of the body of a doll, having two couples of limb-connecting recesses therein;

FIGURE 11 shows a side view thereof, part of which has been broken away, in order to show clearly the inside construction thereof;

FIGURE 12 represents a sectional plan of the split mould assembly, taken on the line XII—XII in FIGURE 10;

FIGURE 13 represents a perspective view of a slide pin or mandrel assembly, partially, however, broken away, which is adapted to shape a limb-connecting recess in a doll body under moulding;

FIGURE 14 is a perspective view of the blow-moulded body of a doll, which is, however, partially broken away, to show one of the arm-joining recesses provided therein;

FIGURE 15 shows a diagrammatic representation, illustrating the electro-hydraulic circuits, incorporated in the bottle blow moulder;

FIGURE 16 represents somewhat modified electro-hydraulic circuits, which are designed for the production of a doll body, those constituents, which have been omitted, being similar to those already illustrated in FIGURE 15;

FIGURE 17 represents a front view of a somewhat modified embodiment of the bottle blow moulder according to this invention, which is provided with a moulding mechanism adapted to blow mould a bottle in its inverted position and wherein the bed plate is movably arranged;

FIGURE 18 is a plan view, illustrating the movable bed plate;

FIGURE 19 shows an end view thereof, part of which is, however, broken away;

FIGURE 20 illustrates a side view thereof;

FIGURE 21 shows an enlarged longitudinal section of the upwardly operating, mouth-edge cutting mandrel assembly employed in the above mentioned blow mould assembly of the inverted model;

FIGURE 21*a* shows the same sectional view of the said mandrel assembly shown in FIGURE 21, wherein, however, the mandrel proper is shown at its withdrawn position;

FIGURE 22 represents a longitudinal section of the cutting device employed in the inverted-mode blow-moulding unit;

FIGURE 23 is an enlarged perspective view of a cutting knife and its guide incorporated in the above cutting device;

FIGURE 24 is an enlarged section of the cutting knife shown in FIGURE 23;

FIGURE 25 is an enlarged front view of a movable mould support, which is provided with mould-positioning means;

FIGURE 26 represents a plan view thereof.

Figure 1:
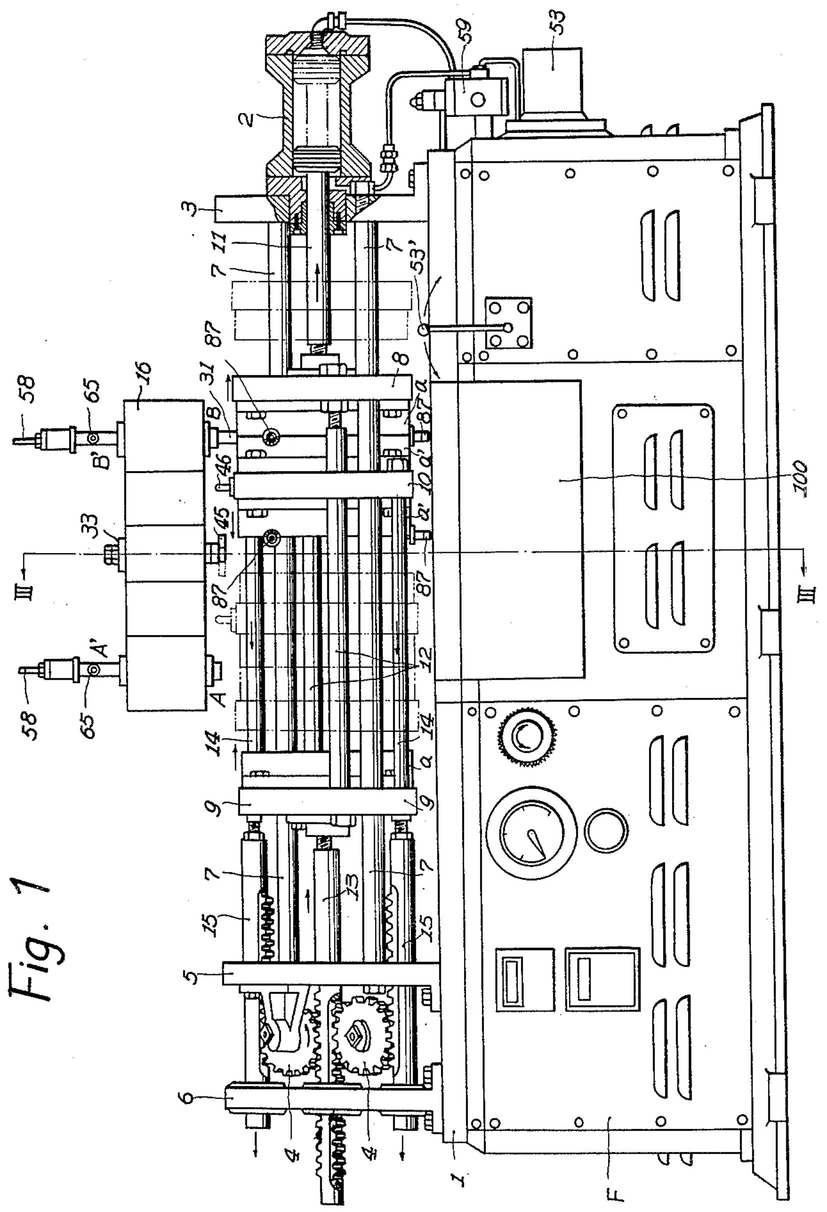
FIGURE 1 shows a front view of a bottle blow moulder having a pair of moulding units, the attached extruder being, however, excluded from the drawing.
Figure 2:
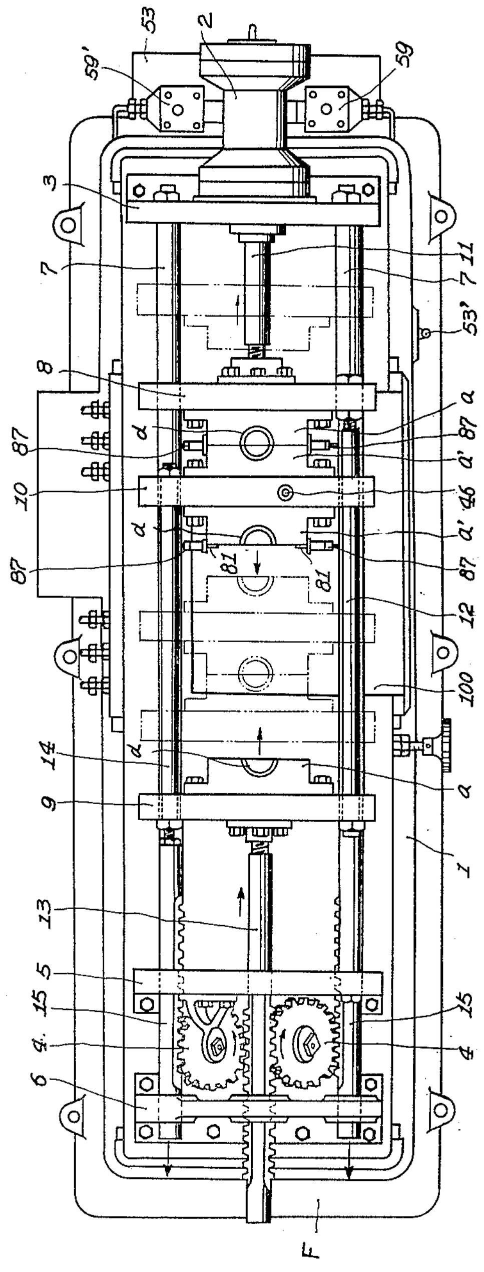
FIGURE 2 represents a plan view of the bottle blow moulder illustrated in FIGURE 1, upper mechanisms thereof and the attached extruder being, however, excluded from the drawing.

Now, referring to the drawings, especially FIGURES 1 and 2, the blow moulder according to this invention includes a machine frame F, wherein a driving motor, a speed-changing mechanism, a plurality of pressure switches, a hydraulic motor and an oil reservoir are contained, all of which will be hereinafter described more in detail. A bed plate 1 is mounted on the machine frame F, said bed plate is arranged stationary or movable, as the case may be. In the first embodiment, the description of which will be set forth below, the bed plate is arranged stationary while in the second embodiment, the bed plate is movably mounted. As shown in FIGURES 1 and 2, a stationary bracket 3 is fixed on the stationary bed plate 1 at its right hand side, and a moulding cylinder 2 is rigidly mounted on the bracket 3 in the horizontal mode. A pair of stationary brackets 5 and 6 are equally mounted on the bed plate 1 at its left hand side, in the fixed manner, any one or both of the brackets 5 and 6 rotatably supporting a couple of pinions 4, which are arranged at an angle of about 45 degrees relative to the horizontal plane and mesh a movable rack bar 13, which will be described hereinafter more in detail.

The blow moulder is provided with a pair of moulding units A and B, each of such units is in turn equipped with a couple of split mould elements *a* and *a'*, each of which is formed as at *e* (FIG. 9) with a semi-circular shaped cutting edge *d* (FIG. 8) projecting inward at the nearly uppermost end of the screwed opening *c* of the mould cavity *b*, said opening corresponding to the neck of the product bottle and the cutting projection or edge being positioned so as to cut the product at its uppermost end from the fed tubing. The cutting edge *d* has a radius just the same as that of the bore of the bottle neck and shaped with a flat plane *f* (FIG. 7) at the lower surface in order thereby to finish-cut the mouth-end of the product, while the upper surface is shaped in an inclined plane *g* to facilitate the desired sharp-cutting operation by means of the thus formed knife edge.

Figure 8:
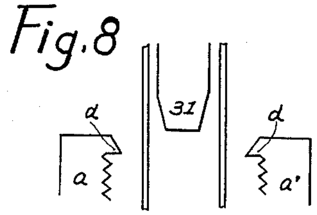
Figure 8A:
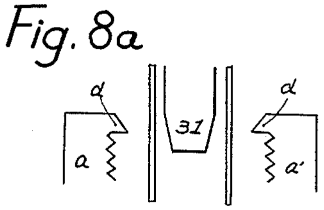
Figure 8B:
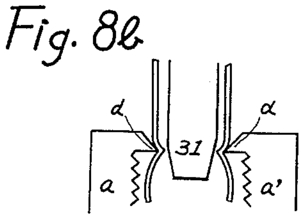
Figure 8C:
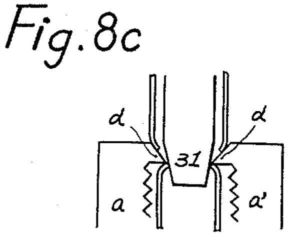

This construction of the cutting edge can be most clearly seen from FIGURES 7–9, inclusive. Between two brackets 3 and 5, a couple of main stays 7 are rigidly mounted, which mount in turn a pair of side plates 8 and 9, each of said plates being attached with a split mould element *a*. Between the two side plates 8 and 9, an intermediate plate 10 is also movably mounted on the main stays 7, the plate 10 being attached with an opposite mould element *a'* on each side surface thereof. The cylinder 2 is provided with a ram or a piston rod 11, which is rigidly connected at its free end with the side plate 8. The side plates 8 and 9 are connected with each other by means of tie rods 12. The aforementioned rack bar 13 engaging with two pinions 4 project from the outer side surface of the side plate 9 at its centre. The pinions 4 also engage with rack bars 15, respectively, which form extensions of bars 14 rigidly connected to the intermediate plate 10. All of said rack bars pass through the end bracket 6 and are slidably supported thereby.

With the above mentioned arrangement, when the side plate 8 and intermediate plate 10 are positioned nearest to each other as shown in FIGURES 1 and 2, the related split mould elements *a* and *a'* are tightly closed or brought into their operative position. When, in this case, the ram or piston rod 11 is moved in the right hand direction seen in these figures, as shown by an arrow, respectively, the side plates 8 and 9 are carried thereby in the same direction. The rack bar 13 connected with the side plate 9 is naturally carried along simultaneously in the same direction, thereby the pinions 4 are rotated in opposite directions, as shown by the attached arrows. The rack bars 15 engaging with these pinions move integrally with bars 14 in the left hand direction as shown by corresponding arrows in FIGURES 1 and 2, causing thus the intermediate plate 10 to move in the same direction to separate the aforementioned closed couple of mould elements *a* and *a'* from each other. This action causes the plate 10 to approach the opposite side plate 9. At the dead point of the ram movement, the now related couple of split mould elements *a* and *a'* are caused to close tightly with each other.

Figures 4, 5, 6:
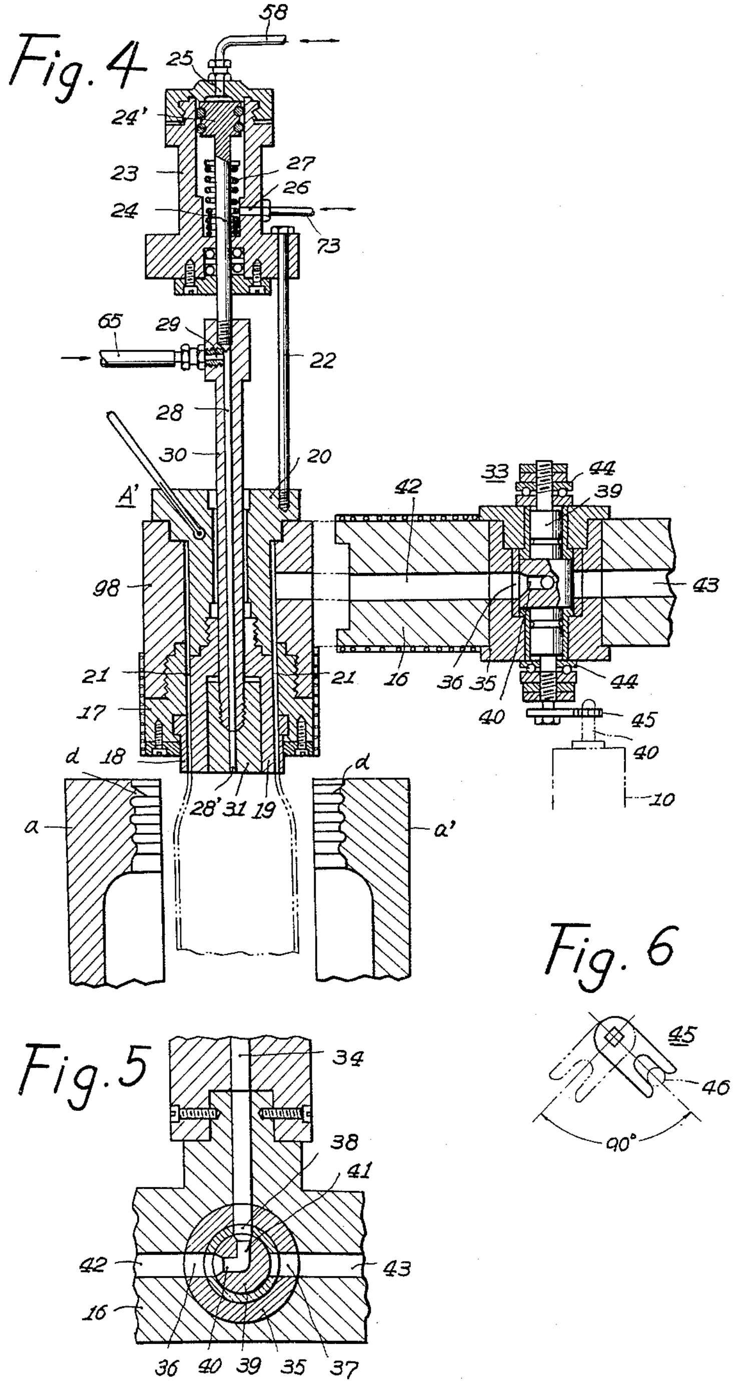
FIGURE 4 illustrates an enlarged longitudinal section of one of the moulding units and a distributor valve or cock connected thereto.
FIGURE 5 shows a horizontal section of essential part of the distributor valve or cock.
FIGURE 6 represents an enlarged plan of an operating fork adapted to operate the distributor valve or cock.

As most clearly seen from FIGURES 1 and 4, tube-shaping assemblies A' and B' are arranged above the moulding units A and B, each of which comprises the above explained split mould assembly. Each of the tube-shaping assemblies A' and B' is supported by a die holder 16 and includes a slidable pin therein, which serves as bottle mouth cutting mandrel as described more fully hereinafter. The tube-shaping assembly A' and B' is formed with a narrow circular space 21 serving for the desired preliminary tube-shaping, which space is defined by outside mould pieces 17 and 18 and shell, on the one hand, and core piece 19 and die presser 20, on the other hand. Above the aforementioned tube-shaping assembly, there is provided die cylinder 23, which is supported by the shaping assembly through the intermediary of a plurality of supporting stays 22, of which, however, only one is illustrated in FIGURE 4. In the die cylinder 23, a piston 24' is movably mounted, the upper and lower cylinder space are provided with oil passages 25 and 26, respectively, and a piston rod 24 made integral with the piston is urged in the upward direction by a coil spring 27 inserted in the lower cylinder space. The piston rod 24 extends downwardly of the die cylinder and is detachably connected by a screw connection with a rod 30, which is provided with a longitudinal bore 28 therein and serving as air passage. The rod 30 is further provided with a blow air passage 29 at its head portion, said connection being connected with a blow air piping 65 as shown. The slide rod 30 extends downwards through die presser 20 and core piece 19, and the thus projecting tip of the rod is detachable screw-connected with the slide pin or bottle mouth edge-cutting mandrel 31, which is formed with a longitudinal air passage 28' communicating with the bore 28. The movable mandrel 31 is slightly tapered, as shown, at its lower half peripheral surface.

When a preliminarily shaped tube is extruded downwards from the circular moulding space 21 of the tube shaping assembly and the length of the tube amounts to a predetermined value, the pressure oil is supplied from an oil piping 58 through oil passage 25 into the upper space of the die cylinder, the piston 24' together with piston rod 24 is moved downwards and thus the mandrel 31 will be caused to project from the bottom side of the tube-shaping die assembly, thus occupying a position corresponding to the neck bore of the product or bottle to be blow moulded. Then, the two split mould elements *a* and *a'* are closed to each other, and the material tube is squeezed between the cutting-edges and the mandrel 31, at the same time, compressed air is supplied from air piping 65, through air passage 29 and bores 28 and 28' into the inside space of the closed split moulds, thus the part of the material tube enclosed thereby being shaped in a bottle. Thus, the cutting edges *d* formed at the neck opening of the moulds finally cut the product bottle off the material tube, in this way the necessary cutting and bottle mouth edge-finishing operations being simultaneously carried into effect. After the moulding operation, the oil pressure prevailing in the upper die cylinder space is released, thereby the piston 24' and piston rod 24 are urged upwards by the action of the spring 27 and the mandrel 31 is brought in to such a position ready for slipping out the neck of the moulded product. The tapered lower peripheral surface of the mandrel serves for the disengagement thereof from contact with the neck, so that the product may asily drop by its own gravity action, as soon as the split moulds are re-opened. It will be clear from the foregoing, that the mandrel 31 serves, in addition to the cutting edge-cooperating base member and bottle mouth-finishing means, for centering the neck bore of the product, as well as for determining the inside diameter of the said bore.

Figure 3:
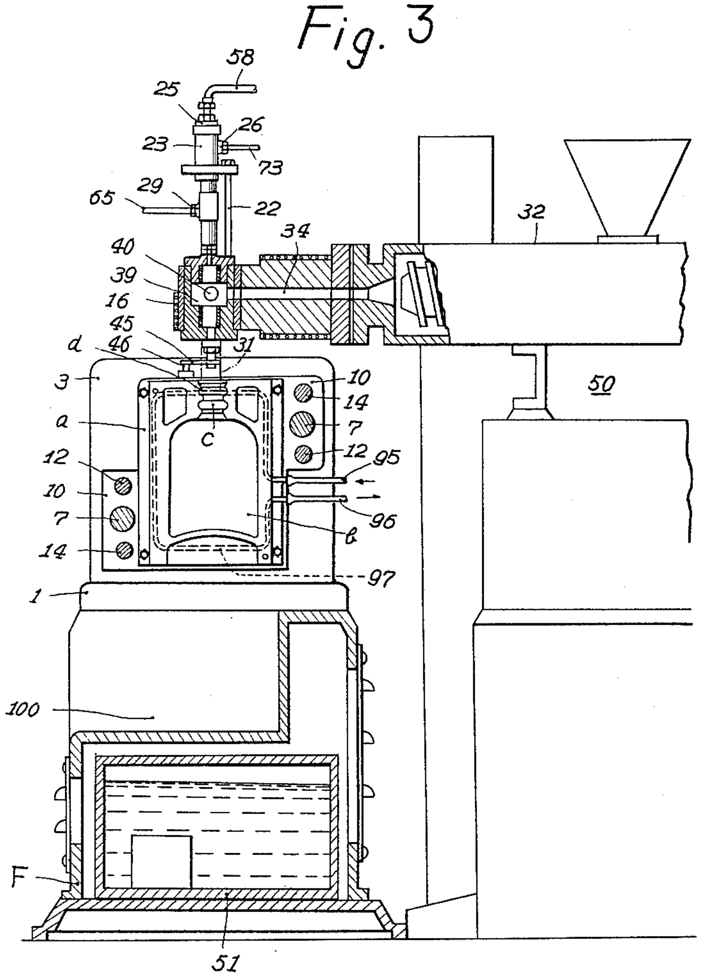
FIGURE 3 shows an enlarged cross-section of essential parts of the above mentioned moulder, taken on the line III—III in FIGURE 1, substantial part of the attached extruder being, however, shown only by its outlines.

Next, the material feeding mechanism shall be explained below in connection with FIGURES 3, 4 and 5. The fluidized material extruded from a cylinder 32 of the extruder, is fed through a material passage 34 to the distributor valve assembly 33 supported by the die holder 16. In the die holder, a bushing 35 is tightly fitted, which is, as shown, in FIGURE 5, provided with three passages 36, 37 and 38 cut through the wall thereof and arranged at right angles to each other, of which the passage 38 communicates with the above mentioned passage 34. A cock 39 is turnably inserted into the central bore of the bushing 35.

Pasages 36 and 37 communicate with distributing passages 42 and 43, respectively, which in combination pass through the die holder 16. Distributing passage 42 communicates with the circular space 21 of the tube-shaping assemb y A' cooperating with moulding unit A, while distributing passage 43 leads to the cylindrical space 21 of the tube-shaping assembly B' attributed to the other moulding unit B. The one-way cock 39 is provided in the conventional manner with an angular passage 40—41 cut therethrough. Thus, when the cock is turned 90 degrees, the connecting passage 42 leading from the extruder cylinder 32 is connected to distributing passage 42 or 43, as the case may be. The turning movement of the cock may be carried out in a smooth manner by the provision of upper and lower thrust bearings 44. At the lower end of the cock, a forked valve handle 45 is rigidly fixed, and a pin 46 is engaged with the fork, said pin being rigidly mounted on the upper surface of the intermediate plate 10 for movement therewith. Each time the intermediate plate 10 moves to and fro, the pin 46 causes the forked valve- or cock-operating handle 45 through the tongue-and-groove connection to turn just 90 degrees, thus the cock being turned alternately to change the distributor passage connection.

When the fluidized material supplied from the supply passage 34 is led through angle passage 41—40 and distributing passage 42 to the circular space 21 in the unit A, mould-closing operation is carried into effect at the side of the other unit B as in the manner described hereinafter more in detail. When the intermediate plate 10 is moved toward the unit A after completion of the mould-closing operation at the side of the unit B, the pin 46 operates the handle 45 to turn the cock 39 by 90 degrees, thus the passage portion 40 communicating with passage 38 and at the same time the passage portion 41 with passage 37, thereby the material is now supplied to the unit B through the distributing passage 43, while the mould-closing operation is carried into effect at the side of the unit A. In the similar manner, each time the intermediate plate 10 once makes the mould-closing operation at either side, the material supply passage as a whole will be changed over from one to the other moulding unit.

Now, referring to FIGURE 15, the mechanism adapted to drive and control the movements of the above mentioned operating parts, shall be explained fully therein below:

When a main switch 99 is turned on, the extruder 50 and a motor 47 start thereby, the motor being contained underneath the bed plate 1, as already mentioned. This starting-up operation causes an oil pump 48 and an air compressor 49 also to start. Now, assuming that the fluidized material is extruded from the extruder cylinder 32 through distributor valve assembly 33 to the circular space 21 in the tube-shaping assembly A' attributed to the unit A, thus extruding a tubular material from the tubular die. At this time, oil has been already supplied from the reservoir 51 by the pump 48 through a piping 52 to a solenoid valve 53. When the tubular material amounts to a proper length, the operator turns a handle 53' to its right hand position shown in chain line in FIGURE 15, thereby closing an electric circuit 54 to energize a magnet 55 and thus to connect the piping 52 to a piping 56 leading to a check valve 57. Through this valve, oil having a relatively lower primary pressure is conveyed through a piping 58 to the die cylinder 23 to lower the piston rod 24, thereby the slide pin or mandrel 31 being caused to enter the neck portion of the tubular material, which movement will continue until the piston 24' arrives at its lower dead point. The oil pressure continues to increase still further and the primary pressure within die cylinder 23 and piping 58 is also increased. The thus increased oil pressure actuates the check valve 57 as well as the pressure switch 59. The check valve 57 changes the oil delivery from piping 58 to piping 60 at a relatively higher secondary pressure, the oil being thereby delivered through a port 61 to the left hand space in the moulding cylinder 2 to move the ram or piston rod 11 in the right hand direction as shown by an arrow attached thereto. The side plates 8 and 9 rigidly connected with the piston are thus moved in the right hand direction as shown by the attached arrows in FIGURES 1 and 2, and at the same time, the rack bars 15 are moved in the opposite direction through the intermediary of a couple of pinions 4 engaging these racks. The intermediate plate 10 is caused thereby to move in the opposite or left hand direction in FIGURES 1 and 2. By this operation, the mould elements *a* and *a'* attached to side plate 9 and intermediate plate 10, respectively are closed to bring the unit A in its operative condition. During the sliding movement of the intermediate plate 10, the pin 46 fixedly mounted thereon will move the forked valve handle 45 to turn the cock 39 by 90 degrees and the material feed is transferred to the right hand side unit B.

On the other hand, pressure oil flowing from piping 60 into piping 62 is led into the lower space of the die cylinder 23', thereby the piston rod 24 being pushed upwards to elevate the mandrel 31 attached thereto. At the present moment, the fluidized material is fed through the aforementioned distributor valve to the related tube-shaping assembly and the tube-extruding process is about to start.

At this stage, the oil pressure actuates a pressure switch 59 and thus the related micro-switch (not shown) is closed to establish an electric circuit 63 leading to a solenoid-type air valve 64, which is thereby operated. By this operation, the compressed air delivered by the compressor 49 is led into the air piping 65, thence through air passages 28 and 28' into the inside space of the tubular material contained within the now closed split mould *a*, *a'* to blow mould the contained material into the desired shape. There is provided a water-cooling jacket 97, with which is connected with water supply and discharge pipes 95 and 96, for the purpose of cooling the blow moulded product. When the operator returns the operating handle 53' to its neutral position as shown by the full line in FIGURE 15, the piping 56 is cut off at its entrance and the oil pressure acting upon the pressure switch 59 is decreased and the electric circuit 63 is opend, thus the solenoid-type air valve 64 being closed, with a result that air delivery through the last mentioned valve is ceased. The pressure oil contained in the solenoid valve 53 returns through oil piping 66 to reservoir 51, as long as the oil pump 48 is under operation.

When the operator turns the handle 53′ in the opposite direction, an electric circuit 67 is established and thus a magnet 55′ of the solenoid valve 53 is energized, so that oil flows through piping 68 into a check valve 69. Then, as in the aforementioned way, oil is delivered at a relatively lower primary pressure to a piping 70, thence into the upper space of the die cylinder 23′, thereby the piston 24′ together with its rod 24 being urged to move downwards. Thus, the bottle mouth mandrel 31 fixed to the piston rod is carried thereby downwards and projects into the inside bore of the tubular material, now contained in the unit B. On the other hand, the increased oil pressure within the die cylinder 23′ actuates the check valve 69 and the oil is directed to a piping 71 at an increased secondary pressure. The thus increased oil pressure is transmitted through a piping 72 into the right hand space in the moulding cylinder 2, thereby the ram 11 being moved to the left seen in FIGURE 15. The side plates 8 and 9 are moved in the opposite direction relative to the attached arrows shown in FIGURES 1 and 2, resulting in that the closed split mould in the unit A is released and thus opened and at the same time the split mould in the opposite unit B is closed. While on the other hand, oil is led from piping 71 through branch piping 73 into the lower space of die cylinder 23 for unit A, thereby piston 24′ together with its rod 24 is moved in the upward direction, carrying along the related bottle neck mandrel 31 in the same direction. By this action, the blow moulded product is separated from the mandrel and drops downward through the open split mould. The oil pressure acts upon a separate pressure switch 59′, as in the similar manner already described, thus establishing an electric circuit 74. Compressed air is delivered through the thus actuated solenoid-type air valve 64′ to a piping 75, which leads to the air passage 28 provided in the tube-shaping assembly B′ attributed to the moulding unit B. The thus supplied blowing air is led through the bore in the neck mandrel 31 into the hollow space of the tubular material contained within the closed split mould *a*, *a′*, for blow moulding the desired product. When the operator turns the operating handle 53′ back to its neutral position, the magnet 55′ is de-energized, so that the piping 68 is closed at its entrance, while the oil pressure acting upon the pressure switch 59′ decreases and thus the electric circuit 74 is opened, with the result that the solenoid air valve 64′ is closed to cease the air delivery therethrough to the piping 75.

By turning further the handle 53′ in the clockwise direction into the chain lined position, the operation as described hereinbefore will be carried into effect, and so on. It will be clear from the foregoing, that with the machine shown and described hereinbefore, a number of bottles may be produced practically in a continuous manner by blow moulding using a couple of moulding units in cooperation with the attached auxiliary devices, repeatedly and alternately.

In the case of blow moulding the body of a doll as shown in FIGURE 14, a somewhat modified split mould assembly must be utilized, especially as shown in FIGURES 10, 11 and 12, in order to produce a plurality of frusto-conical recesses 77 at joint portions 76, by means of which the limbs are to be detachably and movably attached to the body of doll.

The mould assembly consists of a couple of split elements *a* and *a′*, and has a mould cavity *h* corresponding to the outline of the doll body to be moulded. Each mould element is provided at suitable places with semi-circular recesses 79, corresponding to the aforementioned joints 76 on the moulded product, totally four in number, more specifically, one for left side, one for right side and two for the bottom side. When the split mould is closed, each couple of cooperating semi-circular recesses forms in unison a completely round opening passing through the wall of the mould assembly. In each of said round opening, is slidably inserted a slide pin 81, which is formed with a frusto-conical tip 80 corresponding to the recess 77 to be shaped in the doll body. This slide pin 81 is operated by a hydraulic piston 82 so that it may project into the mould cavity *h* at the same time or before the related split mould is closed. The slide pin 81 is withdrawn after the completion of the moulding process, but before opening of the closed split mould. As clearly shown in FIGURE 13, the piston 82 is slidably mounted in a hydraulic cylinder 87, which is provided with oil passage ports 85 and 86, kept in communication with oil pipings 83 and 84, respectively. With the cylinder 87, an auxiliary cylinder 89 is screw-connected as shown, which is formed at its opposite end with a flange 88. The slide pin 81 is slidably mounted in the auxiliary cylinder 89 and fixedly, for instance by means of screw connection not shown, connected with the piston rod 90. The flange 88 is fixed to the split mould element *a* or *a′* as the case may be by means of a plurality of fixing bolts 91 arranged in a semi-circle.

As seen from FIGURE 16, oil piping 83 leading from one side operating chambers of the cylinders 87 belonging to one moulding unit A are connected through piping 92 to the primary pressure piping 58 leading to the check valve 57, while hydraulic pipes 84 communicating with the opposite side cylinder chambers are connected through piping 93 to the primary pressure piping 70 leading to the check valve 69. In the similar way, hydraulic pipes 83′ leading from one side operating chambers of the cylinders 87′ belonging to another moulding unit B are connected through piping 94 to the primary pressure piping 70 leading to the check valve 69, while hydraulic pipes 84′ communicating with the opposite side cylinder chambers are connected through piping 92 to the primary pressure piping 58 coming from the check valve 57.

Now, when pressure oil is led from the solenoid valve 53 through piping 56 to the check valve 57 and the primary oil pressure is led through piping 58 to the die cylinder 23 belonging to the unit A, as in the aforementioned manner, while supplying the fluidized material from the extruder through the related tube-shaping assembly to the corresponding moulding unit, the neck mandrel 31 is pressed downwards into the closed split mould *a*, *a′*, again as in the already described manner, while oil is supplied from piping 92 through branch pipes 83 to one side working spaces of respective recess pin-operating cylinders 87, thereby pistons 82 together with piston rods 90 and slide pins 81 being urged to project through the wall openings 79 into the mould cavity *h*, while at the same time the piston rods in the pin-operating cylinders 87′ belonging to the unit B are moved in the opposite direction to withdraw the respective slide pins 81′. Then, the increased oil pressure to the higher secondary pressure prevailing in the die cylinder 23 is led therefrom through piping 58 and check valve 57 to the piping 60 by the influence of the last mentioned valve so acted and thereby making the necessary changeover operation. The thus conveyed oil pressure actuates the ram 11 of the moulding cylinder 2 to close the related split mould elements *a*, *a′* belonging to the unit A, while the neck mandrel 31 at the side of the other unit B is hydraulically elevated. At this stage, material supply has been changed over from unit A to unit B. Then, the above mentioned increased oil pressure actuates the pressure switch 59 to close the electric circuit 63, with the result that the solenoid air valve 64 is operated so that compressed air is fed through air passages 28 and 28′ to the inside space of the mouldable tube, now contained within the closed split mould assembly *a*, *a'* belonging to the unit B, for blow moulding the material tube, substantially in the same manner as described hereinbefore in connection with the bottle manufacture. However, in this case, as will be clear from the foregoing that in addition to the inserted mandrel 31 in the upper neck portion of the moulding product two couples of slide pins 81 are projected into the product, more specifically, a pair horizontally from opposite sides in the neighborhood of the both shoulders and a couple vertically from bottom in the areas of abdominal region. Thus, in this case, such a hollow body of doll is manufactured that it is provided with a neatly cut upper neck edge by the cutting edges *d* in cooperation with the mandrel 31, as well as with four limb-joining recesses 77, each having the corresponding shape to that of the frusto-conical tip of the slide pin 81, and being adapted for detachable connection of the four limbs.

Next, when oil is fed to the check valve 69 by manually operating the switch handle 53', the mandrel 31' belonging to the unit B is driven into a related split mould *a'*, *a*, while at the same time the oil pressure acts upon the related pin-operated cylinders 87 to cause the slide pins 81' to advance. In the opposite manner, the slide pins 81 operated by the hydraulic cylinders 87 belonging to the unit A will simultaneously be withdrawn.

Then, the increased oil pressure is led from piping 70 to piping 71, thus actuating the ram 11 in the moulding cylinder 2 and thereby releasing the closed split mould in the unit A, from which the related slide pins 81 have been completely withdrawn, while the split mould at the other side unit B, into which the related slide pins 81 have been driven, are closed to operate. Thus, in the same manner as above explained, a doll body having neatly finish-cut mouth edge, as well as four limb-connecting recesses 77 is blow moulded, and so on.

It will be clear from the foregoing that, with use of the above described embodiments according to this invention, the desired neck-end cutting during the blow moulding, and/or the formation of limb-joining recesses, in the case of doll-body manufacturing, wherein these recesses are formed along the moulding fin line and bridge over adjoining split mould edges, may be carried out easily and in a simple manner. With the above mentioned arrangement, the stroke of the slide pins may be increased as desired by a proper design of the related hydraulic driving mechanism, thus producing considerably deeper recesses when occasion may desire. In the similar way, the operating range of the neck mandrel may be increased, if wanted. Further, as already mentioned, in the alternately carried-out closing operations of two couples of the split mould elements, the slide pins are preferably advanced to their operative position, and withdrawn before the release of the closed mould elements, so that the movements of the slide pins give no hindrance to the necessary closure and release of the split mould element, thus assuring the desired moulding operation to be carried out in a fully satisfying manner.

In the aforementioned embodiments of the invention, the bed plate 1 has been arranged to be stationary. If, however, the bed plate is mounted slidably, several additional special features may be obtained as set forth in detail hereinbelow, referring to FIGURES 17–26, inclusive, which illustrate a still further embodiment.

In the present embodiment, the bed plate 1' is arranged movable longitudinally as well as laterally. The bed plate includes in the present embodiment, an upper plate 101, a middle plate 102 and a bottom plate 103. The upper plate 101 extends rearwards and is broader in its width than the remaining two cooperating plates 102 and 103. On the bottom surface of the upper plate 101 and in the neighborhood of its opposite ends, there is provided a pair of racks 104, having an inverted T-section and fixed in parallel to each other a plurality of fixing bolts 105 on to the plate 101, extending in the lateral direction of the latter. Two sets of round openings 106 are cut through the plate 101 in the neighborhood of said racks 104.

The middle plate 102 is provided with grooves 107 cut therein, corresponding in their shape and position to the rack 104, which are placed in these grooves. Substantially in registration with said openings 106, elliptical slots 108 are shaped in the middle plate 102, the major axis of each slot 108 extending longitudinally of the plate 102. A bolt 109 passes through each elliptical slot 108 and screwed into the bottom plate 103. Between said middle and bottom plates 102 and 103 and at the end portions thereof, keys 110 are provided, which extend longitudinally of these plates, so that any relative movement of these plates in the lateral direction can be effectively prevented. To the rear edge of the middle plate 102, brackets 111 are fixed, and a shaft 112 is rotatably secured in these brackets. Pinions 113 mounted on the shaft 112 for rotation therewith, engage said racks 104 mounted on the upper plate 101. On the outer end of the shaft 112, handle 114 is mounted to rotate the shaft.

The bottom plate 103 slightly extends at both longitudinal ends relative to the other two and a bracket 115 is attached to each end of the plate 103 by means of a plurality of fixing screws 116. A bolt 117 is in screw engagment with the bracket 115, the tip of the bolt abutting against the end surface of the middle plate 102.

At the front end edge of the upper plate 101 are fixed two brackets 118 by means of set screws 119, a bolt 120 passing through each bracket 118 and abutting against the front end surface of the middle plate 102. Each of the three plates 101, 102 and 103 is provided with a cut-out recess 121, the position of which corresponds to that of a chamber 100 provided in the machine frame F.

The operation of the above mentioned triple-plate type bed plate 1' shall be described hereinbelow in considerable detail:

When the operator turns the handle 114 and thereby the pinions 113, for instance, in the anti-clockwise direction, seen from the left hand side of FIGURES 18 and 19, the engaging racks 104 and the upper plate 101 attached thereto are caused to slide frontwards.

Thus, split mould elements *a* and *a'*, and the like, mounted on the plate 101 are carried along therewith, so that they move equally in the front direction and in remote from the assemblies A' and B' and the like, which shifting makes the exchange of split moulds and the like operation much easier than with a stationary bed plate. By turning the bolts 117 passing through the bracket 115, the upper and middle plates 101 and 102 can be finely adjusted in their position and longitudinally of these plates, but under the control of bolt 109 engaging in the elliptical slots 106 and within a limited distance equal to the major axis of the ellipse. By this adjustment, the split mould elements *a* and *a'* may be accurately centred relative to the central axis of the circular space 21 of the tube-shaping assembly A' or B', as the case may be, which adjustment assures the correctly tight closing of the mould elements *a* and *a'*, as well as the accurate operation of the neck mandrels or slide pins.

Attachment of split would elements *a* and *a'* on to the movable plate may be carried out in any other suitable manner, instead of most commonly conceivable screw connection by means of fixing bolts or the like. As an example, guides are in advance fixed on the movable plate, and the split mould elements are placed in position through the intermediary of such guides. Such a modified embodiment shall be illustrated more full hereinbelow:

As most clearly shown in FIGURES 25 and 26, each of movable plates 8, 9 and 10 mounts on its mounting surface a couple of stationary guides 154 having an angular cross-section, in a partially embedded manner and in parellel to each other. The guides are held in position by means of a plurality of fixing bolts 155, thus forming a couple of oppositely arranged guide grooves 156, which are adapted to slidably receive the corresponding side edges of the elements *a* or *a'*. At the lower end of the couple of guide grooves, a stopper bar 157 is provided so as to bridge the cooperating guides 154 and fixed in position by means of fixing bolts 158 screwed in the respective movable plate. As will be seen, the stopper bar 157 serves for prevention of the mould element *a* and *a'* from dropping out.

By the provision of the stationary guides 154, the split mould elements, may be, if necessary, easily taken out of position and replaced by any suitable one. In this case, the movable arrangement of the base plate facilitates, to a substantial degree, this kind of operation.

Although in the foregoing embodiments, the neck of the hollow body or bottle to be moulded is placed in the upward direction, so to speak, the moulding process has been carried out with regular positioning of the product to be moulded. If, necessary, however, the moulding may be carried into effect in an inverted manner, as would be clear from foregoing to those skilled in the art. An embodiment of this kind shall be illustrated hereinbelow:

With the invertedly moulding arrangement, neck mandrel assemblies 122 (FIG. 21) and 122' operate in the upward direction and there are provided additionally cutting assemblies 123 (FIG. 22) and 123'. The neck mandrel assembly 122 or 122' is positioned on the single type base pla.e 1 or on the upper plate element 101 ot the three-layer type bed plate 1' so as to occupy a correct centred position relative to the respective closed split mould *a* and *a'* and enough below the latter, in such a way that the mandrel proper projects upwardly from the base plate and the lower mechanism of the assembly depends therefrom and is contained in the chamber 100. The cutting assemblies 123 and 123' are supported, respectively, by brackets 124 mounted on the die holder 16, so as to position at a lower level than the tube-shaping assemblies A' and B', and in the neighborhood thereof.

First, the upwardly operating mandrel assembly shall be illustrated hereinbelow:

As shown in FIGURE 21, each of the mandrel assemblies includes a slide pin or movable mandrel 126, having a longitudinal bore 125 cut therethrough serving as air passage, which mandrel is partially enclosed by a stationary guide sleeve 128 and projects therefrom upwardly. The sleeve 128 is provided at its upper end with a inclined cut surface 127. At the lower end, the mandrel 126 is connected with the piston rod 131 by means of a joint piece 133 having an air passage opening 132 communicating with the air passage 125. Within a hydraulic cylinder 129 a piston 130 is slidably mounted and is connected integrally with the rod 131, while the cylinder is tightly closed at its both ends with an upper and a lower cover plate 135 and 134, respectively. The bottom cover 134 is provided with an oil passage 136 cut therein and in communication with the lower cylinder space, and in the similar way, there is provided an oil passage 137 cut therein, which is in communication with the upper cylinder space. Both cover plates 134 and 135 are rigidly connected with each other by means of a plurality of connecting bolts 138, as shown in FIGURE 21. The sleeve 128 is formed at its lower end with a flange 139, which is rigidly fixed on to the base plate 1 or upper plate 101, as the case may be, by means of a plurality of fixing bolts 140, which are screwed into stay members 141, rigidly mounting the hydraulic cylinder 129 thereon. The above mentioned connecting bolts 138 are also screwed into said stay members 141 at their opposite ends, after passing through the upper cylinder cover 135. By this arrangement, the hydraulic cylinder assembly to actuate the mandrel is advantageously suspended from the base plate 1 or upper plate element 101 of the base.

Next, the cutting assembly 123 or 123' shall be illustrated hereinbelow more fully in detail:

As shown in FIGURES 22 and 23, the bracket 124 rigidly supports a cutting cylinder 144, which is provided oil ports 142 and 143 made in communication with the left hand and the right hand cylinder space, respectively. The cylinder 144 mounts slidably a piston 145, which is rigidly connected with a piston rod 146 projecting outwardly of the cylinder and provided at its tip with a knife-mounting frame 147 rigidly connected therewith, by screw connection as at 146'. The frame 147 is formed in a forked piece, having two parallel legs 149 and a large central recessed opening 148, as shown. The frame 147 is slidably received by a couple of parallel guide channels 150, which are fixed on the bottom surface of the bracket 124, each of said channels having a channel-shaped guide groove 151, which slidably engage with the outside edge of the leg 149. A knife blade 152 bridges over the pair of said legs 149 at their free ends and are fixed thereto in a suitable manner. The knife 152 is shaped in a trapezoid as shown or in a triangle in its cross-section, having a pair of sharpened edges 153, which serve as knife edges as most clearly seen from the sectional view illustrated in FIGURE 24.

The operation of the above mentioned, inverted mode blow moulding unit, shall be explained herein below:

When the tube-shaped material extruded from the circular space 21 of the tube-shaping assembly A' or B', amounts to a suitable length, pressure oil is fed through the passage 136 into the lower space of the cylinder 129 or 129' of the assembly to actuate the piston 130 together with piston rod 131 to move upwards. Thereby, the mandrel 126 projects substantially from the enveloping sleeve 128 as shown in FIGURE 21. At this stage the related couple of split mould elements *a* and *a'* come nearest to each other to establish a closed mould unit embracing the mandrel 126. Pressure air is supplied through the air passage 132 and thus the tubular material is blow moulded within the closed mould cavity. Then, direct-before the mould elements *a* and *a'* are urged to separate from each other, oil is fed through the port 142 into one side working space of the cutting cylinder 144 or 144' of the cutting assembly 123 or 123', as the case may be, to operate its piston 145. The knife-mounting frame 147 mounted on the tip of the related piston rod 146 is caused to slide forward to cut the moulded product off the tubular material by means of the edge 153 of the knife 152.

In this case, the cutting is carried into effect so as to produce the neatly cut surface accurately to leave a precisely round mouth opening on the material tube, so that in the next moulding step the mandrel 126 may easily enter the inner hollow space of the thus cut end of the material tube.

After the completion of the blow moulding, the closed set of mould elements *a* and *a'* is released to open, while pressure oil is fed through the oil passage 137 into the upper space in the hydraulic cylinder 129 and thus the mandrel 126 is withdrawn into the sleeve 128. Then, the moulded product is caused to incline relative to the vertical plane as illustrated in FIGURE 21*a*. The product is inclined in contact at its neck end with the inclined upper end surface 127 of the sleeve 128, so that it will drop into the chamber 100 without any hindrance. The hydraulic circuits utilized to carry out the above mentioned operations may be suitably connected with the hydraulic circuits shown and described hereinbefore referring to FIGURES 15 and 16.

Although certain particular embodiments of the invention are herein disclosed for purposes of explanation further modifications thereof, after study of this specification, will be apparent to those skilled in the art to which the invention pertains. Reference should be accordingly had to the appended claims in determining the scope of the invention.

What is claimed and desired to be secured by Letters Patent is:

1. An improved blow moulder for making hollow articles from plastic materials by extrusion and blowing, said moulder comprising: a supporting structure; a pair of tube-extrusion means spaced horizontally apart and fixed to said supporting structure; bed plate means vertically spaced from said tube extrusion means and movably mounted in said supporting structure for adjustment in a horizontal plane; a pair of moulding units spaced horizontally apart and slidably mounted on said bed plate means, said units being respectively positioned on the extrusion axes of said extrusion means, and each said unit being split and having opposing elements one of which is nearer an element of the other unit than the other which is an end element, said opposing elements of each unit being slidable symmetrically with respect to its associated extrusion axis to open and closed positions, the adjacent elements of both said units being fixed back to back, and tie rods rigidly connecting the end elements of both said units; mechanical engaging means respectively fixed to said bed plate means, back to back elements and to one of said connected end elements, said means interengaging to be alternately operable in relatively opposite directions to simultaneously move along an axis of movement all said elements of both said units alternately to said closed position in one unit and said open position in the other unit; and a single ram means mounted on said bed plate means and operably connected to the other of said end elements for alternately moving said end element in opposite directions and thereby driving said engaging means, whereby only one ram means is required to drive a pair of moulding units to said open and closed positions, and the moving elements of each unit respectively move only half the distance between said positions.

2. An improved blow moulder as described in claim 1 characterized in that said engaging means comprise: main stays rigidly fixed to said bed plate means and slidably mounting all said elements; a double rack bar having two oppositely disposed racks fastened to the center of an end element and extending along said axis of movement; two pinions rigidly mounted on said bed plate means and adapted to engage respectively the oppositely disposed racks of said double rack bar to rotate in opposite directions; two single rack bars secured to said elements fixed back to back and extending parallel to said double rack bar with the racks of the single rack bars respectively opposite the oppositely disposed racks of the double rack bar and adapted to diametrically engage therefrom the respective pinions, whereby movement of one of the elements drives all the elements equally through said racks and pinions, the elements of each said unit moving oppositely to each other and to the corresponding elements of the other unit thereby opening one said unit and closing the other.

3. A blow moulder as described in claim 2 characterized in that said tube extrusion means comprise: means for extruding a tube between the elements of a moulding unit in the open position, and a mandrel for blow moulding said extruded tube, said mandrel having a cone-shaped end section for insertion into said extruded tube before the split mould unit is closed; and said opposite elements of a mould unit have sharp inwardly sloping and projecting shoulders defining peripheral knife edges at the injection end of said elements, whereby the cone-shaped end section of said mandrel cooperates with said knife edges when said mould unit is closed to cut the extruded tube cleanly in a finished end.

4. An improved blow moulder as described in claim 2 wherein said bed plate means comprises a single plate mounted stationary on said supporting structure.

5. An improved blow moulder as described in claim 2 wherein said bed plate means comprises a bottom, intermediate and top superimposed plates, said bottom plate being mounted stationary on said supporting structure, said intermediate plate being mounted on said bottom plate and slidable thereon longitudinally only relative thereto; and said top plate being mounted on said intermediate plate and slidable thereon transversely only thereto, a first and mechanical means mounted on the bottom plate for engaging and slidably moving said intermediate plate and the top plate mounted thereon longitudinally only relative to said stationary bottom plate; and a second mechanical means mounted in said intermediate plate and engaging said top plate for slidably moving said top plate transversely only relative to the intermediate and stationary bottom plate, whereby elements mounted on said top plate are adjustable longitudinally and transversely with respect to elements directly mounted on said supporting structure.

References Cited in the file of this patent

UNITED STATES PATENTS

| | | |
|---|---|---|
| 2,298,716 | Moreland | Oct. 13, 1942 |
| 2,854,691 | Strong | Oct. 7, 1958 |
| 2,861,295 | Hagen et al. | Nov. 25, 1958 |
| 2,928,120 | Leghorn et al. | Mar. 15, 1960 |
| 2,930,079 | Parfrey | Mar. 29, 1960 |
| 2,943,349 | Adams et al. | July 5, 1960 |
| 2,967,330 | Tommarchi | Jan. 10, 1961 |
| 2,980,955 | Sanko | Apr. 25, 1961 |

FOREIGN PATENTS

| | | |
|---|---|---|
| 1,030,004 | France | June 9, 1953 |
| 561,790 | Belgium | Nov. 14, 1957 |
| 789,816 | Great Britain | Jan. 29, 1958 |